United States Patent [19]

Tilton

[11] Patent Number: 5,283,640
[45] Date of Patent: Feb. 1, 1994

[54] THREE DIMENSIONAL TELEVISION CAMERA SYSTEM BASED ON A SPATIAL DEPTH SIGNAL AND RECEIVER SYSTEM THEREFOR

[76] Inventor: Homer B. Tilton, 8401 E. Desert Steppes Dr., Tucson, Ariz. 85710

[21] Appl. No.: 830,238

[22] Filed: Jan. 31, 1992

[51] Int. Cl.$^5$ .................. H04N 13/00; H04N 13/02; H04N 13/04
[52] U.S. Cl. ......................... 348/42; 348/44; 348/135
[58] Field of Search ................... 358/88, 89, 3, 107

[56] References Cited

U.S. PATENT DOCUMENTS

| | | | |
|---|---|---|---|
| 2,877,457 | 3/1959 | Gimpel | 358/89 |
| 4,396,945 | 8/1983 | DiMatteo | 358/107 |
| 4,654,699 | 3/1987 | Medina | 458/88 |
| 4,994,898 | 2/1991 | Ling | 358/88 |
| 5,081,530 | 1/1992 | Medina | 358/88 |

Primary Examiner—Howard W. Britton
Attorney, Agent, or Firm—J. Michael McClanahan

[57] ABSTRACT

A three-dimensional television camera system based on a spatial depth signal and receiver system therefor is disclosed wherein a video depth signal is generated in spatial synchronization with the raster scan of a TV camera viewing a scene. The video depth signal is generated by taking the ratio of the outputs of a pair of spaced apart sensors receiving a reflected laser beam of a laser projector situated between the sensors. The laser projector, sensors, and TV camera are in close proximity to each other. A portion of the energy receiving photocell of each sensor is blocked by a parallax barrier so that a proportion of the reflected laser beam energy is detected and that receipt of energy is angle dependent. By such construction, the depth difference of two points proximate each other is sensed. A continuous video depth signal is outputted in synchrony with the TV camera video signal to the receiver system. The described receiver system employs two TV cathode ray tubes to be viewed stereoscopically, i.e., one for each eye. On CRT operates as in a convention television receiver receiving the TV camera video signal and the other CRT receives the same video signal except the horizontal sweep component is modified by the video depth signal. By such instrumentality, a scene is viewed in three dimensions much like the sell known stereoscope.

20 Claims, 2 Drawing Sheets

THREE DIMENSIONAL TELEVISION CAMERA SYSTEM BASED ON A SPATIAL DEPTH SIGNAL AND RECEIVER SYSTEM THEREFOR

BACKGROUND OF THE INVENTION

1. Field of the Invention

The field of the invention is three dimensional television, their camera systems and their receiver or monitor systems.

2. Description of the Related Art

Certainly the most common example of three dimensional image perception is the example of a person's vision. When viewing an object, a person's eyes usually are situated at the same vertical height but separated horizontally by 2 ½ inches or so. As each eye sees the same scene, the perspective each eye sees of the scene is slightly different. For example, the left eye, because of its spaced-apart position from the right eye, will see just slightly more or less around a corner or curved surface than the right eye. If the scene viewed by the eyes is broken up into many very small dots of viewing perception, the left retina will receive some dots which are horizontally displaced from dots received by the right eye due to depth difference and due to the fact that the left eye is spaced apart from the right eye. However, no "advantage" is gained vertically since there is no vertical displacement between the eyes and the same vertical component is seen by both eyes. The person's brain receives the images from each eye and, bu processes not yet understood, compares and combines the images to give a 3-dimensional sense to the scene viewed by the person.

It is thus clear that the lessons of the eye may be applied to television camera and receiver systems by utilizing two closely spaced television cameras viewing the same scene whereupon the video signal output of each camera is directed to a pair of television receivers. The scene viewed by each camera is repeated on the cathode ray tube of a respective receiver. Then, if a party were to view the two receivers steroscopically, i.e., where a person's left eye could only view the CRT of the television receiver receiving the output of the left television camera and the right eye viewing only the CRT of the television system receiving the output of the right television camera, the eyes would then see on the television CRTs exactly what they would see if they were viewing the scene themselves. The person's brain would interpret the two displays to reveal its 3-dimensional aspects. Map makers employ similar techniques when they view photographs taken from adjacent cameras (or from a single camera which is moving in a straight-line motion) through a stereoscope to determine height information of the ground or perhaps more commonly, to draw elevation contour lines on maps.

Now there has been much effort in the field of reproducing scenes on television receiver CRTs that take on the appearance of 3-dimension. For example, Drewlo, in U.S. Pat. No. 4,963,959, describes a 3- dimensional cathode ray tube display wherein two television cameras view the scene from different points. The output electronic video signals from the two cameras are mixed and then transmitted via a broadcast antenna. The resultant composite signal is received by a sole video receiver which separates the electronic signals of the two cameras. Then, in a time division multiplex, each signal is applied in time to the electron gun at the rear of the cathode ray tube. In an alternate embodiment, the cathode ray tube incorporates a pair of electron guns, one for each of the signals from the cameras. When one electron gun is utilized, and utilizing time multiplexing, one camera's output is shown on the TV screen and the displayed image directed via a prism surface to the viewer's left eye. Subsequently, the second camera display is routed through a separate prism to the viewer's right eye. Thus with the two gun approach, each gun is so oriented as to display the scene on separate portions of the cathode ray tube such that each portion is viewed by different eyes. Such is accomplished by constructing the cathode ray tube display surface as a linear Fresnel lens. Because the viewer is receiving independent video screens related to their eyes, the result is the perception of depth.

In other 3- dimensional display apparatus disclosed in United Kingdom Patent Application No. 2,206,763, a cathode ray tube is viewed through a lens, such as a lenticular array, followed by a spatial light modulator such as a liquid crystal display. Different views of the scene are provided on the cathode ray tube in a time-multiplex manner. By such apparatus, different views and directions from which they are visible correspond to different views of the scene and thus the appearance of 3-dimensions is given.

Still other devices, such as that shown in U.S. Pat. No. 4,943,860 to Hattori, utilize a Fresnel lens in front of a cathode ray tube display as the substantial part of 3-dimensional viewing. Utilizing Fresnel lens or lenticular lens between the cathode ray tube display and the viewer is a popular scheme in attempting to present 3-D viewing of a television CRT.

However, from the very fact that past attempts of 3-dimensional television have not been widely adopted, it is obvious that the systems heretofore proposed both by the inventors recited above and other systems which abound have not met with great public acceptance.

Accordingly, it is obvious that there is need for a 3-dimensional television camera and receiver system which overcomes problems inherent with the above systems, and in addition is easy to implement and relatively inexpensive.

SUMMARY OF THE INVENTION

The embodiment of the invention described consists of a 3-dimensional television camera system based on a spatial depth signal and the receiver system displaying the observed scene. In that respect, the present invention utilizes a single television camera to view the scene of which the 3-dimensional view is to be displayed. Setting along side or preferably atop the television camera is a centrally located laser projector. The laser projector is operably connected to the camera to receive the horizontal and vertical raster signals generated by the camera raster generator. The laser beam is mechanically or electrically manipulated to scan in synchronism with the horizontal and vertical sweeps of the television camera so that the laser beam illuminates each point in the scene simultaneously with the television camera viewing that same point as it makes its horizontal scans in successive vertical steps.

Situated on both sides of the laser projector are triangulation sensors which are sensitive only to the laser beam, either to the frequency of the laser beam or, if the laser beam is coded, to the coding of the laser beam. These triangulation sensors are situated at the same vertical height as the laser projector but spaced horizontally apart from each other.

Since each triangulation sensor views the scene from a slightly different position, much as a person's eyes do, the horizontal position from which the reflected laser beam is received by each is slightly different, depending upon the particular angle that the point being viewed has with the impinging laser beam. This accounts for the depth that one sees, such as a wall that falls away from a person's view. The two electrical output signals of the triangulation sensors are constituted such that when their outputs are compared in a comparison circuit which outputs the ratio of the two signals, the ratio being the video depth signal. Provisions are also made to generate a default signal in the event that neither triangulation sensor receives the reflected laser beam (e.g., if the scene is very distant) or one of the sensors does not receive sufficient reflected laser energy to output an electrical signal.

Two video signals are sent to the receiver system, one the luminance video signal output of the television camera and second the video depth signal. Chrominance video (for color) may also be sent as currently done.

The receiver system associated with the camera system may utilize a system with two cathode ray tubes, a left and right CRT. The receiver system receives the usual camera output signals, i.e., horizontal and vertical synchronization pulses, and the color and intensity signals and in its normal fashion, generates the horizontal and vertical sweep voltages and then sends these processed horizontal and vertical scan signals to the yoke of one CRT. The horizontal scan or sweep signal is modified in accordance with the video depth signal received from the camera system and this modified horizontal signal is sent, together with the vertical sweep signal, and color and intensity signals to the second CRT. The reason for modifying the horizontal sweep for one CRT is to synthesize the second image required for a stereo pair of images. The rationale will become clear presently.

In this receiver embodiment, the two CRTs are positioned side-by-side and are viewed stereoscopically, i.e., the person's left eye sees the left CRT and the person's right eye sees the right CRT. By such an arrangement, the person's brain then fuses the images on each of the CRT's display together and 3-dimensional viewing is afforded.

Accordingly, it is an object of the present invention to provide a 3-dimensional camera system based on a spatial depth signal.

It is another object of the subject invention to provide a receiver system adapted to use a depth video signal for 3-dimensional display presentation.

Other objects of the invention will in part be obvious and will in part appear hereinafter. The invention accordingly comprises the apparatus possessing the construction, combination of elements and arrangement of parts which are exemplified in the following detailed disclosure and the scope of the application as which will be indicated in the claims.

BRIEF DESCRIPTION OF THE DRAWINGS

For further understanding of the features and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
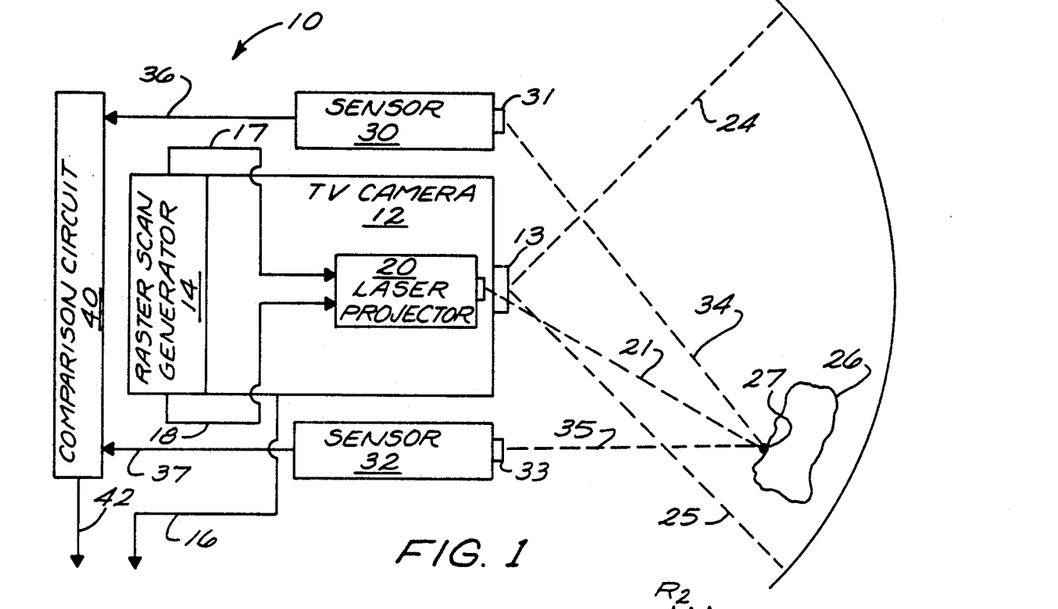
FIG. 1 is a functional block schematic diagram of the camera system.

Referring now to FIG. 1, a simplified block schematic diagram is shown of the inventive three dimensional (3-D) television camera system. Briefly, the major components making up the camera system comprise a conventional television (TV) video camera 12, a part of which has been portioned off for illustrative reasons, namely the raster scan generator 14 of the camera's internal electronic circuits. Sitting atop video camera 12 and spatially aligned with camera 12 is laser projector 20 which emits a very narrow beam of light or other radiant energy along a path in accordance with information received from raster scan generator 14. Situated on opposite sides of laser projector 20 and spaced close to it, are left triangulation sensor 30 and right triangulation sensor 32. Shown immediately behind television video camera 12 and its raster scan generator portion 14 is triangulation comparison circuit 40.

The above components all function together to generate firstly, a conventional intensity and color video signal which is outputted from camera 12 along electrical line 16, and secondly, a depth video signal which exits triangulation comparison circuit 40 through electrical line 42. These two signals present on electrical lines 16 and 42 are used in the receiver system to produce a three dimensional video image.

In more detail, video camera 12 has a field of view through its lens 13 defined by dotted lines 24 and 25. The video camera scans the field of view in its conventional way, firstly starting at a point, such as in the upper left-hand corner of the field of view, and then scanning horizontally. As it scans horizontally it also moves down slowly, then snaps back and makes another horizontal scan. This pattern is repeated until the full field of view has been encompassed with nearly horizontal lines (in the conventional manner) similar to the words and sentences that appear on this page. Horizontal and vertical raster scan voltages which direct the scanning procedure are produced in video camera 12 by the raster scan generator which, in FIG. 1, has been portioned off in camera 12 and designated with numeral 14. Once the camera has completely scanned the field of view, the scan is then repeated. In most American and Japanese conventional video cameras, the field of view is scanned 60 times a second in two interlaced fields, giving a frame rate of 30 per second, two fields constituting one frame.

As the energy receiving surface interiorly to the camera receives the light along each point of scan lines, a continuous electrical signal is produced (in a conventional manner) relating to the intensity of light seen by the camera along each of the horizontal scans. Thus at any one point on the field of view and at any instant of time, corresponding light intensity and color video signals are produced.

Laser projector 20 sitting atop video camera 12 receives two inputs from raster scan generator 14 of camera 12, these inputs consisting of the vertical raster scan signal on electrical line 17 and the horizontal raster scan signal on line 18. Both the vertical and horizontal raster scan signals are sent to laser projector 20 to direct the movement of the outputted laser beam such that it scans in spatial and temporal synchronization with that point (of the view) that video camera 12 is instantaneously sensing. Thus, all points in the field of view of video camera 12 scanned by video camera 12 are in time and place simultaneously illuminated or "tagged" by the laser beam. Of course, this requires both mechanical and electrical alignment and synchrony of video camera 12 and laser projector 20 so that the electrical signal output of TV camera 12 and comparison circuit 40 are also in synchrony.

Alternately, raster scan generator 14 may be a separate master unit sending a vertical and horizontal scan voltage signal to both camera 12 and laser projector 20 for each of their use, or raster scan generator 14 may output a sole synch (synchronization) signal to the laser projector which synchronizes a second raster scan generator serving laser projector 20.

Shown also in FIG. 1 are the two triangulation sensors 30 and 32, which sensors are sensitive to the light wavelength (and temporal coding) of the laser beam. These sensors view the whole scene and receive the reflected laser energy, but are configured in such a way as to produce an electrical signal whose amplitude is dependent on the reflected spot'3 horizontal position (as will be shown later) as the laser beam scans the scene following the raster scan pattern of video camera 12. Shown attached to each of the left and right triangulation sensors 30 and 32 respectively are their respective lenses 31 and 33 respectively. Those "lenses" may consist of simply an open optical aperture.

Referring to the example of a scene 26 in the field of view in FIG. 1, point 27 on scene 26 is representative of an instantaneous position of the point being sensed by video camera 12. Since the laser beam direction represented by dotted line 21 is slaved to synchronize with video camera 12 through raster scan generator 14, laser beam 21 is also illuminating point 27 at that instant in time that light information from point 27 is being processed by camera 12. Now it is preferred that the radiant energy of laser beam 21 be out of the visible range of light which video camera 12 senses, therefore infrared (IR) or deep red may be utilized. The laser beam may also be coded. Consequently, the laser beam energy reflected back to the camera system is not sensed by video camera 12. However, left triangulation sensor 30 and right triangulation sensor 32 are constructed with light sensitive diodes or other light sensitive elements particularly sensitive to the radiant energy of the laser beam outputted by laser projector 20. The reflected energy from the laser beam to each of the triangulation sensors is indicated by left reflected component 34 and right reflected component 35. Since the light sensitive elements of triangulation sensors 30 and 32 are only sensitive to laser beam 21, or, by suitable attachments, are made sensitive to the laser beam only, these sensors do not output an electrical signal for any other light, especially visible light, which may also enter their lenses. In an alternate method, the laser beam may be digitally encoded and then decoded by the sensors to insure that only the desired laser energy is sensed. Note that the lenses of sensors 30 and 32 are receiving light from all parts of scene 26, as well as the whole field of view seen by camera 12.

The output of video camera 12 along electrical line 16 is the normal and conventional video signal representative of the intensity and color of light seen by camera 12 in its scanning. The electrical signal output of each of the triangulation sensors 30 and 32 along lines 36 and 37 respectively is representative of the intensity of the received incoming energy of reflected laser beam 21 modified by the horizontal direction (angle) of the reflected beam (as is later discussed in connection with FIGS. 2 and 3), and varies in direct relationship to the incoming angle. Different amounts of received reflected laser energy beam will be seen by the photocells in each of the triangulation sensors due to the direction-sensing filter placed ahead of each photocell as will be seen. If for example, the spot 27 illuminated by laser beam 21 happens to be so situated (or angled) with respect to laser projector 20 that more reflected laser energy is received by the photocell in right triangulation sensor 32 than by the photocell in sensor 30, this shows up as the output of right sensor 32 having a greater amplitude electrical signal at that instant of time than the electrical output of left triangulation sensor 30. Of course this anticipates that the light sensitive elements (photocells) in each of the sensors are matched. The above may be imagined by a laser beam diffusely reflected off the surface at point 27.

Processing of each of the electrical signal outputs of left and right triangulation sensors 30 and 32 respectively is accomplished by triangulation comparison circuit 40. This circuit compares one of its electrical inputs with the other on a continuous basis by taking a ratio so that at any instant of time, a signal representative of the ratio of its two inputs at that time is outputted. Equal inputs to triangulation comparison circuit 40 results in a voltage output equal to "1" from circuit 40 along electrical line 42, and a greater signal from left triangulation sensor 30 (over that of right triangulation sensor 32) will result in a voltage signal output from circuit 40 greater that "1". Similarly a greater signal output from right triangulation sensor 32 (over that of left triangulation sensor 30) will result in a voltage signal output from triangulation comparison circuit 40 less than "1".

As the laser beam scans the scene, it is obvious that different amounts of laser energy will be reflected depending on the point-to-point reflective optical characteristics of the scene as the laser scans. However, this unuseful intensity-fluctuating component of the reflected laser energy from point to point is cancelled out (removed) by virtue of the nature of the signal processing that is performed in triangulation comparison circuit 40, specifically, by the fact that the ratio of signals 36 and 37 is used to develop the signal 42. Also, a mere change in horizontal or vertical position of the tagged scene point will not produce a change in the depth signal output unless, of course, there is an accompanying change in depth.

Consequently, two kinds of video output are available for processing by the receiver, which may be a cathode ray tube type television set, the first kind being the normal and usual conventional intensity and color video signal output of video camera 12 on electrical line 16 along with horizontal and vertical sync signals, and the second kind being a depth video signal on line 42.

When the camera video signal 16 is considered together with the output of the triangulation comparison circuit, camera system 10 shown in FIG. 1 functions much like the human visual system in its perception of three-dimensional scenes. In the human eye, the retinal image received by one's left eye and one's right eye are slightly different due to the eye separation (each eye sees the scene at a slightly different angle), which difference the brain processes to finally produce neural depth information to give the perception of stereo depth. Here the same concept is embodied electronically. How the brain knows which points in the left retinal image corresponds to given points in the right one is a mystery. In the subject invention, this information is obtained by each point being tagged in turn with the laser beam.

It is noted that in the preferred embodiment, operation of the device permits physical placement of the left and right sensors very close to the video camera such as, for example, no farther apart than humans' eyes. Of course, with closeness like this, stereo depth perception will be lost at great distances, such as when viewing distant mountains or the like just as it is with a person's direct viewing. Left and right triangulation sensors 30 and 32 may be moved apart a distance greater than usual 2 ½ inches separation distance of a human's eyes; however, at larger separation distances, three dimensional viewing may be anomalous at points since one sensor may see a portion of the scene not seen by the other sensor, i.e., seeing around a corner. Like human eyes, the two sensors are just very slightly angled towards each other.

In addition, there may be situation where sensors receive insufficient or no reflected laser energy. In that case, it is necessary to set the depth video output 42 to a "default" voltage, thus communicating that condition to the receiver. Presence of a default value of depth video would signal to the receiver monitor that it should treat those scene points as if they were at "infinite" distance.

Figures 2, 4, 5:
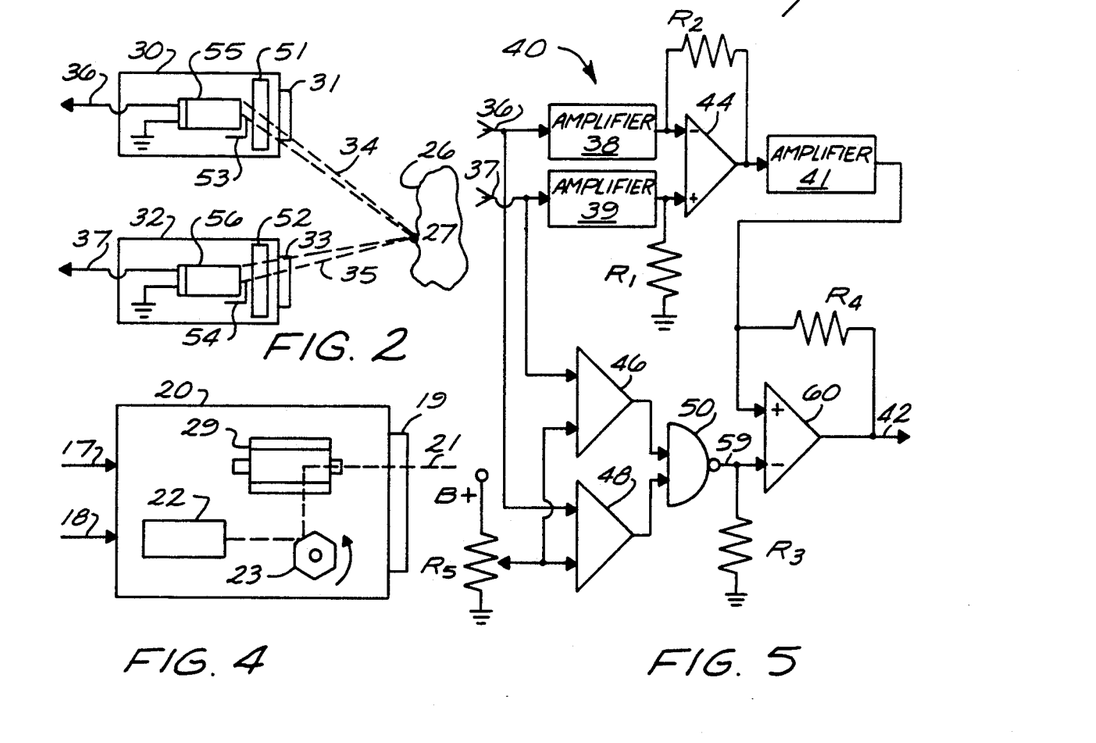
FIG. 2 is a functional block schematic diagram of the triangulation sensors.
FIG. 4 is a block schematic diagram of the laser projector.
FIG. 5 is a schematic diagram of the triangulation sensors comparison circuit.

FIG. 2 illustrates an expanded block schematic diagram showing generally the interior construction of left and right triangulation sensors 30 and 32 respectively. More particularly, situated immediately behind front lens 31 interiorly of left triangulation sensor 30 is a narrow bandwidth optical filter 51 so selected to pass only reflected light signals having the wavelength of the laser energy. Following close behind optical filter 51 is parallax barrier 53 which may be blackened metal or other opaque material partially shading the light input opening of the light sensing element 55, such as a photocell. The parallax barrier is spaced in front of the active surface of the photocell by an amount, perhaps 5 to 10 mm, to allow a true parallax to operate. Parallax barrier 53 may be mechanically attached to the casing of photocell 55 or may be attached to other mechanical structure within left triangulation sensor 30 providing, of course, mechanical attachment of photocell 55 within sensor 30 is similarly fixed. Photocell 55 is selected to be receptive to the wavelength of the laser energy so that it has maximum sensitivity to reflected laser energy. The electrical output of photocell 55 is then communicated along left triangulation sensor signal output line 36 as shown in FIG. 1.

In right triangulation sensor 32 shown in the bottom portion of FIG. 2, all the same elements exist as in left triangulation sensor 30, in fact, the sensors are interchangeable. For example, narrow bandwidth optical filter 52 is inside right triangulation sensor 32 immediately behind front lens 33 followed in turn by right parallax barrier 54 and right photocell 56. In accordance with the invention, parallax barriers 53 and 54 must have the same orientation relative to each other, i.e., in relationship to a viewed scene or object, they would be on the same side of the photocell and they shield the energy receiving surface of the photocells in the same manner and by the same amount, perhaps half. Each of these barriers has a single vertical straight edge crossing the photocell opening, the edges similar in construction and parallel to each other. This requires the mounting fixture of sensors 30 and 32 to observe the barrier's requirement of parallel orientation.

Obviously also, the photocells must be reasonably-well matched to have the same transfer characteristics. That is, their respective graph curves of electrical output vs. laser quantity energy input must match. The reasons for these requirements are readily seen by the need for accurate measurement (relative to each other) of the left and right reflected component of reflected laser beams 34 and 35. Naturally, the assumption was made that laser projector 20 (not shown in FIG. 2) is situated centrally between left and right triangulation sensors 30 and 32 respectively as shown in FIG. 1.

In the example shown in FIG. 2, the reflected laser beam from point 27 of scene 26 received by the sensors (because of the placement of the parallax barriers) subtends a greater angle along right component 35 of the reflected laser beam to right triangulation sensor 32 than left component 34 of the reflected laser beam received by left triangulation sensor 30. It is not intended that either the apertures 31 and 33 or the filters 51 and 52 should impede or prevent reception of the reflected laser beam by photocells 55 and 56 other than their intended purpose. Only the parallax barriers 53 and 54 shall block completely. Because of the parallax barriers, it is apparent that the angle between the point 27 and the respective sensors is sensed. That is, a change in angle produces a change in sensor output.

Just as obvious, the signal output on electrical line 37 outputted from right triangulation sensor 32 will be greater than the signal output on electrical line 36 from left triangulation sensor 30 in the case depicted. As explained in connection with FIG. 1, as these signals are continuously compared for their ratio (with one signal consistently the numerator and the other signal consistently the denominator), there would be a lesser signal output (less than 1.0) or a greater signal output (greater than 1.0) from triangulation comparison circuit 40. Obviously, for the case shown in FIG. 2, if the output of triangulation comparison circuit 40 is less than 1.0, right sensor 32 output is the denominator and left sensor 30 output is the numerator. The two photocells will produce a constant ratio in electrical output as a scene point moves left and right or up and down, but a changing ratio as it moves toward and away from the camera position, i.e., the ratio between the two photocell outputs will not change as a scene point moves left and right, but that ratio will change as it moves in depth. That is the desired action, and governs the output of the triangulation comparison circuit. Reference is made to the Vieth-Muller horopter circle where for our purposes the assumption is made that at great distances from the sensors (in relation to the distance the sensors are apart), the horopter circle between adjacent viewed points is a straight line if there is no change in distance from the sensors. The shape of the horopter circle is the same for the present invention as for human vision since both systems rely on sensing the relative angles of incoming light rays at the two sensor (or eye) positions. See *Vision and Visual Perception*, Clarence H. Graham, Editor, John Wiley & Sons, 1966., 522-524, and 532-535.

Figure 3:
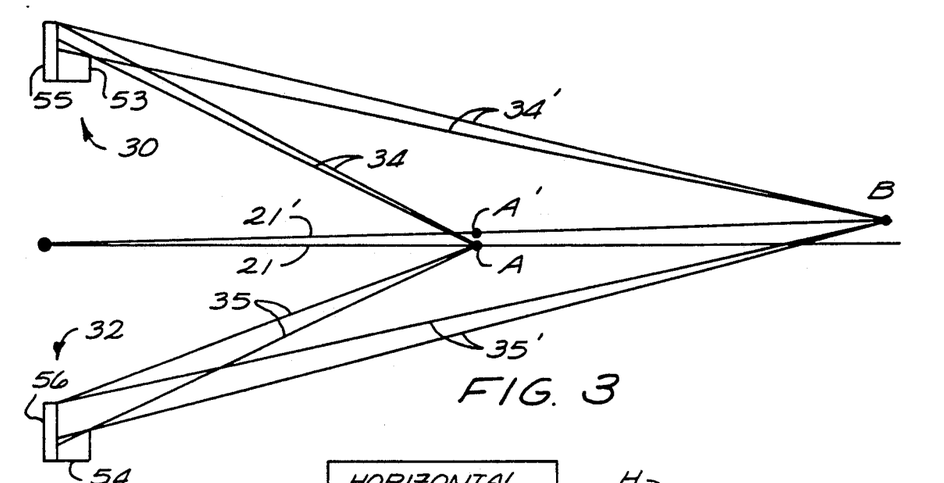
FIG. 3 is a ray-tracing diagram of the triangulation sensors viewing a scene.

FIG. 3 shows an example of the invention in use wherein a rather extreme example of change of depth is shown where the laser beam in scanning has impinged upon point A and then when reviewed in the next instant of time is impinging upon point B. It is realized that the laser beam scans continuously so in this example instantaneous slices of time were carved out to show laser beam 21 and 21' at points A and B. Point A and point B are separated from each other a relatively large distance and point A is a large distance from the left and right sensors 30 and 32 (relative to the distance between sensors 30 and 32).

In FIG. 3, shown on the left hand portion of the drawing are laser energy sensitive photocells 55 and 56 as well as their respective connected parallax barriers 53 and 54. The barriers in FIG. 3 are shown attached to the photocells whereas in FIG. 2 the barriers are slightly spaced away from the photocells. It doesn't make any difference so long as the barriers are situated to shield a portion of the energy receiving surface of each of the photocells. It is noted that the barriers must be spaced away from the photocell surface in order to make appropriate use of the angles of the reflected laser beams which will be impinging upon the barriers and photocells.

Situated intermediate between the left and right sensors is the source of the laser beam, namely laser projector 20, Laser projector 20 emits laser beam 21 and then an instant of time later the beam is situated where shown by the numeral 21'. In accordance with the reflected laser beam shown in FIGS. 1 and 2, right laser beam component 35 is reflected from point A to photocell 56 and left laser beam component 34 to photocell 55. In a comparison of the received reflected laser beam energy, photocell 56 receives a great deal more energy past barrier 54 than does photocell 55 receive past barrier 53.

As seen in the drawing, and roughly estimating the ratio of the received energy of photocell 55 to photocell 56, it would appear that the ratio might be in the order of about 0.3. Of course the ratios of the energy received will depend upon the shape of the photocell surface, whether it is round or square. Clearly, if the photocell surfaces were round, the ratio of the energy received by photocell 55 over that of photocell 56 would be even less than the estimated 0.3.

For the case of the reflected laser beam energy returned from point B along reflected lines 34' and 35', it can be seen that the ratio has moved to perhaps a value of 0.7. Thus, there is a little over a doubling of the ratio of the energy of one reflected beam over the other and thus the video depth signal will reflect such a doubling.

Earlier above, a statement was made that there was no change of the ratio between the two reflected beams as the point reflecting the laser beam is moved horizontally or up and down. That may be easily seen in the drawing of FIG. 3 where the point A' is placed left of point A along laser beam 21'. Although lines showing the reflected beam returning to the photocells from point A' are not shown, it is easily seen that the reflected energy received by the photocells would both be changed in the same direction so their ratio would remain unchanged. Now admittedly, if Point A' were moved left to the position where perhaps it would be at the same level as photocell 55 (with reference to FIG. 3 where distances are greatly exaggerated), there would be a great change in reflected energy seen by photocell 55 and photocell 56 but their ratio would remain unchanged in accordance with the principle of the horopter.

Referring now to FIG. 4, an embodiment of a mechanical type laser projector in a block diagram type illustration is shown comprising a laser diode 22 outputting laser beam 21. The beam first strikes rotating mirror assembly 23, is reflected onto second rotating mirror assembly 29, and lastly emerges out of laser projector 20 through aperture 19. Each of the rotating mirror assemblies 23 and 29 will have many flat plate mirrors attached to a round cylinder, one of the mirror assemblies rotating at a rate related to the video camera 12 horizontal raster scan rate and the other mirror assembly rotating at a rate related to the vertical raster scan rate. Mirror assembly 23 rotates about a vertical axis to produce a horizontal scan, and mirror assembly 29 rotates about a horizontal axis to produce a vertical scan. In the orientation of the rotating mirrors 23 and 29 shown in FIG. 4, laser beam 21 would actually be emitted out of the paper and into the eye of the reader. To synchronize the rotational rate of each of the mirrors, the horizontal scan voltage and the vertical scan voltage from the raster scan generator 14 (FIG. 1) are inputted on lines 17 and 18 respectively to laser projector 20 shown. Devices of the type shown in FIG. 4 are known in the art and FIG. 4 is illustrative of one of the types. The specific type shown in FIG. 4 is more fully described in *TV Engineering*, McGraw Hill, 1985, page 12.31 wherein the vibrating mirror therein described has been replaced by the inventor with a rotating mirror. The Inventor is also aware of current research using other means, such as electronic means, to deflect laser beams in the same manner in which video cameras scan a scene and those have been reported in the literature, see also *TV Engineering*, McGraw Hill, 1985, page 12.30. There is no intent by the Inventor to limit the invention to any one particular type of laser projector.

FIG. 5 is a schematic diagram of a simplified comparison circuit such as may be employed as the triangulation comparison circuit 40 utilized in the invention. The outputs of matched photocells 55 and 56, whose outputs appear on electrical lines 36 and 37 respectively, are directed to logarithmic amplifiers 38 and 39 respectively. Since a division of one number by another may be taken by converting each number to logarithms, subtracting one logarithm from the other, and then taking the antilog, the circuit shown in FIG. 5 accomplishes that operation. More particularly, the outputs of logarithmic amplifiers 38 and 39 are directed to the input of operational amplifier 44 which has been appropriately biased by grounding resistor R1 and has added feedback resistor R2. The output of operational amplifier 44, which is the continuous difference between the logarithmic values of signals 36 and 37, is directed to antilogarithmic amplifier 41. The output of logarithmic amplifier 41 is the depth video signal. The above is a well known implementation of this kind of signal processing. If either (or both) signal 36 or 37 falls below a threshold level, i.e., if either (or both) sensors does (do) not receive sufficient reflected laser energy, then a depth default signal need be outputted.

The depth default signal is generated by that portion of the circuit shown in FIG. 5 immediately below amplifier 44, namely comparators 46 and 48, and NAND gate 50. Each of these comparators receives as its first input the respective output of the matched photocell 55 or 56 on electrical line 36 or 37. Each comparator also receives on its second input a fixed reference voltage derived by picking off the voltage on potentiometer R5. The outputs of comparators 46 and 48 are fixed voltages so long as the inputs from lines 36 and 37 are each greater than the reference voltage supplied by potentiometer R5. Comparators are commonly used in analog and digital circuits and in this case, with inputs from lines 36 and 37 greater than the reference voltage, a digital "1" would issue at each comparator output. Nominally a digital "1" is +5 volts dc. In the event the voltage from either line 36 or 37 fall below the reference voltage, a digital "0" or zero volts dc would output from the particular comparator. The outputs of both comparators are directed to the inputs of NAND gate 50. NAND gate 50 is a component also used in digital circuits which outputs a digital "1" only when both inputs are digital "0". Otherwise the output is a digital "0". This means that when both inputs to NAND gate 50 are 0 volts, NAND gate 50 would output a +5 volts. Thus if either or both signals 36 or 37 become too weak, the output of NAND gate 50 become "1". That is the depth default signal and appears on line 59.

If for example, the output from detector 30 on electrical line 36 were zero volts as no reflected laser beam was detected by photocell 55, and yet there was an output of comparator 46 would be a plus voltage, say 5 volts, and the output of comparator 48 would be zero volts. With those conditions, the input to NAND gate 50 would be a digital "1" and digital "0" resulting in an output on line 59, a default output of +5 volts. Also in the case where both the outputs of electrical lines 36 and 37 were zero volts, or a voltage below the reference voltage determined by potentiometer R5, would the output of both comparators 46 and 48 be zero volts. In that case, default voltage from NAND gate 50 on line 59 would be a +5 volts.

The resultant depth video signal 42 which will be used shown in FIG. 5 is obtained by summing the output of antilogarithmic amplifier 41 with the output of NAND gate 50 (line 59) in summing amplifier 60. Amplifier 60 is connected with feedback resistor R4 connecting the positive input from amplifier 44 and the negative input from NAND gate 50 biased above ground by resistor R3.

The depth video signal on line 42 reflects the continuous ratio of the output signals of detectors 30 and 32 on lines 36 and 37 except for those cases when either or both detectors fail to receive the reflected laser beam. In those cases, output 42 is a constant voltage representing "infinite" depth.

It is apparent that the three-dimensional television camera system described in this invention is compatible with conventional TV systems, in which case the depth video signal is simply ignored. In addition, the depth video signal can be used in specially-designed receiver monitors to produce stereo images or multiple images used in autostereoscopic receiver monitors. One special stereo receiver monitor is shown in FIG. 6.

Figure 6:
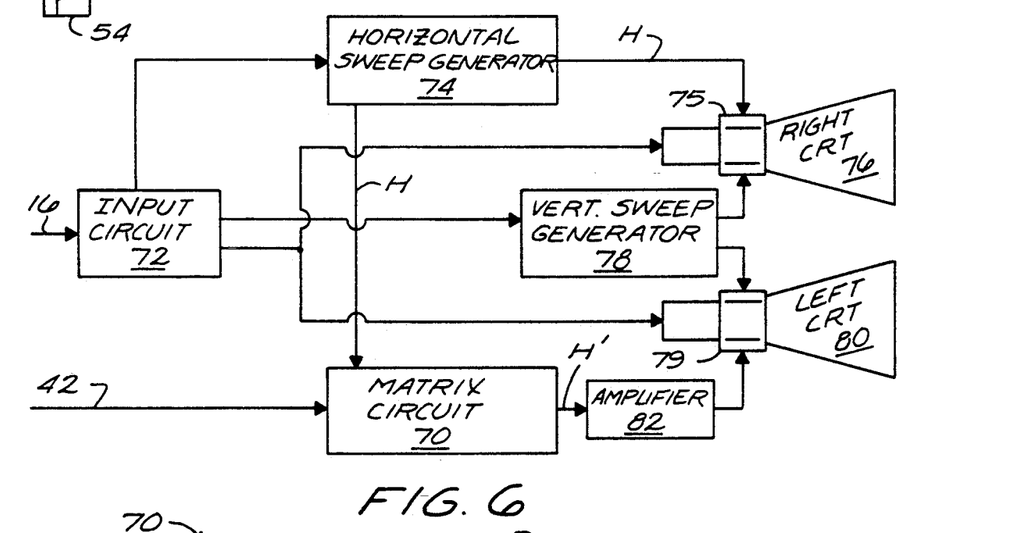
FIG. 6 is a block schematic diagram of the particular described receiver system.

FIG. 6 details in a block schematic diagram form a television receiver system which utilizes the depth video signal generated above to present on a television cathode ray tube display consisting of two CRTs, a three dimensional image when viewed stereoscopically, i.e., the left image is seen only by the left eye and the right image is seen only by the right eye. In a side-by-side arrangement of two TV CRTs, the use of a prismatic or mirror stereoscope is required, such as is the technique used by map makers with overlapping photographs.

As is well known and discussed in the Inventor's recent book entitled THE 3-D OSCILLOSCOPE, Prentice-Hall, Inc., 1987, in the stereoscopic art, the relationship between two images of the same scene viewed from two horizontally spaced apart TV cameras (but at the same height), the vertical components on the TV CRT screen are identical, but the horizontal image components are related by the equation:

$$H' = cD + H,$$

where H may be taken as the horizontal sweep of one CRT, H' the horizontal sweep of the other, c is a constant between +1 and −1, D is the instaneous depth position with D=0 corresponding to the position of a reference frontal place or "window". D is obtained by subtracting 1 from the depth video signal 42. If the two cameras are close together, c approaches zero and if c does equal 0, that means that both cameras are viewing the same scene from the very same spot and H'=H. With cameras as far apart as a person's eyes, a relatively small distance, c would be in order of + or − 0.1. Whether c is a positive or negative value depends on which TV camera is the reference camera. The constant "c" for the horizontal sweep component of the other camera would be positive if it is to the left of the reference camera and would be negative if it is to the right of the reference camera. The above equation assumes that the TV cameras are so matched in output that in viewing the same scene, their output of intensity and color video signals are the same such that the output of either one would be sufficient to provide the intensity and color video signals to both TV CRTs.

With the above parameters, it thus becomes apparent that one TV camera would be sufficient to supply all the video signal information to both TV CRTs except if the horizontal sweep component of the TV camera is directed to one CRT, then the horizontal sweep component received by the other CRT should account for the fact that its view of the object is just slightly over from the view of the TV camera. This is similar to the say a person's eyes function. In normal stereo vision, each eye of a person sees the same scene and the only difference in the information is that one eye's slightly different view relates to the fact that that eye sees a little further around the corner, if you will, than the first eye.

It thus becomes readily apparent that the depth video signal which was generated by the apparatus detailed above then can be combined with a given TV camera horizontal sweep component to modify that horizontal sweep component to ultimately produce the three dimensional scene upon two TV CRTs as the CRTs are viewed stereoscopically. This would be equivalent to utilizing two TV cameras, one connected to each TV CRT, while in reality requiring only one TV camera.

FIG. 6 shows such a TV receiver system which accepts the video signals from the above detailed three-dimensional camera system. Two cathode ray tubes can be used as shown to display the video information from the TV camera system, one CRT receiving the video information directly, and the other CRT receiving the video information with the horizontal sweep component modified.

With specific reference to FIG. 6, the receiving circuitry for the two television CRTs is shown in schematic block diagram form. With the exception of the block 70, the block components represent the normal and usual circuits utilized in television receivers. To the immediate left in FIG. 6 are the two inputs from the 3-dimensional television camera system of FIGS. 1 and 5, namely electrical line 16 which contains the normal and usual output of the video camera 12, i.e., the horizontal and vertical sweep synchronization pulse, and the video intensity and color information signal, all residing on electrical line 16. Line 16 is received by the usual television receiver input circuit, here shown as block 72. As is the normal and usual procedure in television receivers, the horizontal sync signal is sent to the horizontal sweep generator of the receiver which outputs H, the horizontal sweep, to right cathode ray tube or CRT. Input circuit 72 also sends the vertical sync signal to the vertical sweep generator 78 wherein the vertical ramp signal V is generated, which is then directed to the yoke 75 of the right CRT 76 and yoke 79 of the left cathode ray tube or CRT 80. Shown on both cathode ray tubes is the input of the video color and intensity signals which enter at the base of both the right and left CRTs from input circuit block 72.

The depth video signal present along electrical line 42 from the triangulation comparison circuit 40 shown in FIGS. 1 and 5 is inputted into block 70 which contains the depth matrix circuitry. In addition, block 70 receives the horizontal sweep signal H from block 74, the horizontal sweep generator. The depth video signal and the horizontal sweep signal H are combined in matrix 70 in accordance with the equation (1) above referenced, namely:

$$H' = cD + H \tag{1}$$

The output of matrix block 70 is then sent to video amplifier 82 and onto yoke 79 of left CRT 80. Amplifier 82 is of a normal video amplifier type and is well known in the art.

Thus the two CRTs, namely right CRT 76 and left CRT 80 receive identical electrical signals as far as concerns the vertical sweep signal V, and the intensity and color signals with the only difference being that right CRT 76 receives a linear horizontal sweep signal H generated by the ramp generator of block 74 upon receipt of the sync signal from TV camera 12 shown in FIG. 1 and the left CRT 80 receives as its horizontal sweep H', the horizontal sweep signal generated by the ramp generator 74 modified by the depth video signal of triangulation comparison circuit 40 on line 42. The horizontal sweep signal input H' into left CRT 80 will thus be a non-linear sweep signal.

Figure 7:
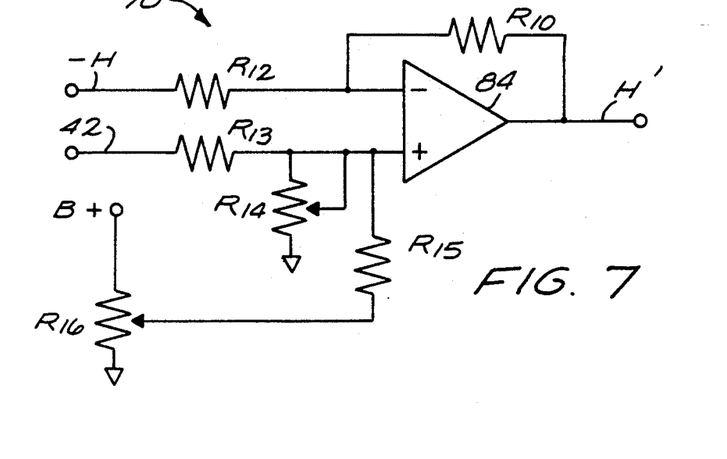
FIG. 7 is a schematic diagram of the depth video signal matrix circuit.

Referring now to FIG. 7, a schematic diagram is shown of the matrix block 70 where equation (1) is implemented. More specifically, FIG. 7 shows a feedback operational amplifier with two inputs, the first input being the horizontal sweep signal H from horizontal sweep generator 74 and the second input being the depth video signal along electrical line 42 from the triangulation comparison circuit 40. It is noted that since the horizontal sweep is inputted to operational amplifier 84 on its negative input, it is necessary that negative component of horizontal sweep signal H, i.e., −H, be utilized. Each signal line input utilizes an in-line resistor, either resistor R12 or R13, and the c constant multiplier is determined by means of a variable potentiometer R14. A voltage divider network is formed between resistors R13 and R14, thus implementing the multiplication of the depth video signal by the c portion of the equation. Resistors R15 and R16 provide the bias necessary to make D from the video depth signal; the relationship being D = (depth signal) − 1. Feedback resistor R10 joins the operational amplifier output H' to the negative input H. The modified horizontal sweep signal H' output is sent on to video amplifier 82 (FIG. 6) and then to yoke 79 of left CRT 80.

The net result thus is that the right CRT 76 receives all video information to present the image as seen by TV camera 12 (FIG. 1) while left CRT 80 receives all the same information with the exception that the horizontal sweep ramp signal is modified by the video depth signal output of triangulation comparison circuit 40, i.e., the ratio of the laser beam detector outputs.

The left and right CRTs are then viewed stereoscopically much like the prior art stereoscopes by the viewer which, with the right CRT seen by the party's right eye, and the left CRT seen by the party's left eye, will impart the perception of 3-dimensional viewing to the watcher.

Now while it is realized that the modified horizontal scan signal H' was used without further modification to produce the horizontal scan on the left CRT 80, and that the modified horizontal scan signal H' is not a linear saw-tooth signal as is horizontal scan signal H, it would be possible to convert the luminance and chrominance video for the synthesized anxillary view (by use of a scan converter) so that the same linear horizontal scan signal could be used with both images. Such detailed description is, however, beyond the scope of this invention.

Also, while two side-by-side CRTs are utilized in the above description, it is obvious that these same techniques can be applied to advanced CRT designs in which two or more stereoscopically-related images are shown on a single screen in such a way that the images can be stereoscopically sensed without the need for a stereo viewer. Such CRTs are the subject of other disclosures such as, for example, Hamasaki, et al, *Autostereoscopic 3D TV on a CRT*, 1991 International Symposium, Seminar & Exhibition of the Society for Information Display, Anaheim, Calif., 1991.

While a preferred embodiment of the device has been shown and described, it will be understood that there is no intent to limit the invention by such disclosure, but rather it is intended to cover all modifications and alternate constructions falling within the spirit and the scope of the invention as defined in the appended claims.

I claim:

1. A three-dimensional television camera system comprising:
    a TV camera for viewing a scene, said TV camera viewing the scene in accordance with its internally generated vertical and horizontal raster scan voltage signals to output a TV video signal; and
    means generating a video depth signal, said means operably connected to said TV camera to receive said TV camera internally generated vertical and horizontal raster scan voltage signals, said means including:
    a laser projector proximate said TV camera;
    a left and right sensor, spaced apart, situated on opposite sides of said laser projector, each said sensor having an output; and a comparison circuit operably connected to said left and right sensor, said comparison circuit receiving said output from each said sensor and outputting said video depth signal whereby said three-dimensional television camera system outputs said video depth signal and a TV camera video signal for processing by a TV receiver system for three dimensional television viewing.

2. The three-dimensional television camera system as defined in claim 1 wherein said TV camera is operably connected to said laser projector, said laser projector receiving the vertical and horizontal raster scan voltage signals from said TV camera.

3. The three-dimensional television camera system as defined in claim 2 wherein said laser projector includes a laser emitting a directable beam of energy, said laser beam directed in accordance with said vertical and horizontal raster scan voltage signals received from said TV camera, said laser beam in spatial synchronization with said TV camera as the scene is viewed, said laser beam reflected from the scene back to said left and right sensors.

4. The three-dimensional television camera system as defined in claim 3 wherein said comparison circuit receiving said output from each said sensor takes a ratio of said left sensor output to said right sensor output, said ratio operably used to determine said video depth signal.

5. The three-dimensional television camera system as defined in claim 4 wherein said comparison circuit includes a pair of logarithmic amplifiers, a summing amplifier connected to said logarithmic amplifiers, and an antilogarithmic amplifier connected to said summing amplifier, one of each said logarithmic amplifiers receiving an output from either said left or right said sensor and determining its logarithm, said summing amplifier subtracting one logarithm from the other to obtain a difference, and said antilogarithmic amplifier taking the antilogarithm of the difference to determine the ratio of said left sensor output to said right sensor output.

6. The three-dimensional television camera system as defined in claim 5 wherein said comparison circuit further includes a default circuit, said default circuit also receiving each said output from each said sensor, said default circuit generating an output dependent upon one or both said output from each said sensor.

7. The three-dimensional television camera system as defined in claim 6 wherein said output of said default circuit and said output of said antilogarithmic amplifier are subtracted from each other to obtain said video depth signal whereby said video depth signal is either a signal indicative of depth between adjacent points on the scene being viewed or is a default video signal.

8. The three-dimensional television camera system as defined in claim 3 wherein each said left and right sensor contains a laser energy receiving photocell, each said photocell having a surface to receive said laser beam energy reflected from the scene being viewed.

9. The three-dimensional television camera system as defined in claim 8 wherein each said left and right sensor includes a parallax barrier, each said parallax barrier partially shielding each said photocell energy receiving surface.

10. The three-dimensional television camera system as defined in claim 9 wherein said parallax barrier of each said left and right sensor is spaced away from each said photocell energy receiving surface.

11. The three-dimensional television camera system as defined in claim 10 wherein said left sensor photocell is positioned relative to said right sensor photocell and said parallax barrier of said left sensor is positioned relative to said parallax barrier of said right sensor.

12. The three-dimensional television camera system as defined in claim 11 wherein each said left and right sensor outputs an electrical signal proportional to the reflected laser energy received by said partially shielded energy receiving surface of said contained photocell.

13. A three-dimensional television receiver system for viewing a scene in three dimensions comprising:
a first means to receive a TV video signal from a TV camera viewing the scene, said first means processing the received TV video signal, said first means including:
an input circuit, said input circuit receiving the TV video signal from the TV camera, said input circuit outputting a vertical and horizontal synchronization signal;
a first horizontal scan generator connected to said input circuit to receive said horizontal synchronization signal, said first horizontal scan generator outputting a first horizontal scan voltage signal; and
a vertical scan generator connected to said input circuit to receive said vertical synchronization signal, said vertical scan generator outputting a vertical scan voltage signal;
a second means operably connected to said first means to receive the processed TV video signal, said second means additionally receiving a video depth signal, said video depth signal in synchronization with the processed TV video signal received, said second means operably modifying said processed TV video signal in accordance with said video depth signal so received;
said second means including a second horizontal scan generator, said second horizontal scan generator receiving said video depth signal in synchrony with the TV video signal, said second horizontal scan generator also connected to said first horizontal scan generator to receive said first horizontal scan voltage signal, said second horizontal scan generator modifying said first horizontal scan voltage signal in accordance with said video depth signal to output a second horizontal scan voltage signal;
a cathode ray tube display operably connected to said first means to receive the processed TV video signal, said cathode ray tube display also operably connected to said second means to receive said modified processed TV video signals, said cathode ray tube display presenting the scene which when viewed stereoscopically by an observer, takes on aspects of three dimensions.

14. The three-dimensional television receiver system as defined in claim 13 wherein said cathode ray tube display includes:
a left cathode ray tube operably connected to said first horizontal scan generator and said vertical scan voltage generator, said left cathode ray tube receiving said first horizontal scan voltage signal and said vertical scan voltage signal; and
a right cathode ray tube operably connected to said second horizontal scan generator and connected to said vertical scan generator, said right cathode ray tube operably receiving said second horizontal scan voltage signal and said vertical scan voltage signal, said left cathode ray tube presenting the scene in accordance with the TV video signal received from the TV camera and is viewed by the left eye of an observer, and said right cathode ray tube presenting the scene in accordance with the TV video signal received from the TV camera having said horizontal scan voltage signal modified by said video depth signal and is viewed by the right eye of an observer in three-dimensional stereoscopic viewing.

15. In combination, a three-dimensional television camera and receiver system for viewing a scene in three dimensions comprising:
- a TV camera for viewing a scene, said TV camera viewing the scene in accordance with its internally generated vertical and horizontal raster scan voltage signals to output a TV video signal;
- a first means generating a video depth signal, said first means operably connected to said TV camera to receive said TV camera internally generated vertical and horizontal raster scan voltage signals, said first means including:
  - a laser projector proximate said TV cameras;
  - a left and right sensor, spaced apart, situated on opposite sides of said laser projector, each said sensor having an output; and
  - a comparison circuit operably connected to said left and right sensor, said comparison circuit receiving said output from each said sensor and outputting said video depth signal;
- a second means operably connected to said TV camera for receiving said TV video signal, said second means processing the received TV video signal;
- a third means operably connected to said second means to receive said processed TV video signal, said third means also operably connected to said first means comparison circuit to receive said video depth signal, said third means modifying said processed TV video signal with said video depth signal; and
- a cathode ray tube display operably connected to said second means to receive said processed TV video signal, said cathode ray tube display also operably connected to said third means to receive said modified processed TV video signals, said cathode ray tube display presenting the scene which when viewed stereoscopically by an observer, takes on aspects of three dimensions.

16. The combined three-dimensional television camera and receiver system as defined in claim 15 wherein said laser projector includes a laser emitting a directable beam of energy, and said TV camera operably connected to said first means to receive said TV camera internally generated vertical and horizontal raster scan voltage signal defines said TV camera operably connected to said laser projector to receive said vertical and horizontal raster scan voltages, said vertical and horizontal raster scan voltage signals operably directing said directable beam of energy in spatial synchronization with said TV camera as the scene is viewed, said laser beam reflected from the scene back to said left and right sensors.

17. The combined three-dimensional television camera and receiver system as defined in claim 16 wherein each said left and right sensor contains a laser energy receiving photocell, each said photocell having a surface to receive said laser beam energy reflected from the scene being viewed, and each said left and right sensor includes a parallax barrier, each said parallax barrier of each said left and right sensor spaced away from each said photocell energy receiving surface a predetermined distance, each said parallax barrier partially shielding each said photocell energy receiving surface.

18. The combined three-dimensional television camera and receiver system as defined in claim 17 wherein each said left and right sensor outputs an electrical signal proportional to the reflected laser energy received by said partially shielded energy receiving surface of each said contained photocell, and said comparison circuit receiving each said output from each said sensor takes a ratio of said left sensor output to said right sensor output, said ratio operably used to determine said video depth signal.

19. The combined three-dimensional television camera and receiver system as defined in claim 18 wherein said second means includes:
- an input circuit, said input circuit receiving the TV video signal from said TV camera, said input circuit outputting a vertical and horizontal synchronization signal;
- a first horizontal scan generator connected to said input circuit to receive said horizontal synchronization signal, said first horizontal scan generator outputting a first horizontal scan voltage signal; and
- a vertical scan generator connected to said input circuit to receive said vertical synchronization signal, said vertical scan generator outputting a vertical scan voltage signal; and said third means includes a second horizontal scan generator, said second horizontal scan generator receiving said video depth signal in synchrony with said TV video signal, said second horizontal scan generator also connected to said first horizontal scan generator to receive said first horizontal scan voltage signal, said second horizontal scan generator modifying said first horizontal scan voltage signal in accordance with said video depth signal to output a second horizontal scan voltage signal.

20. The combined three-dimensional television camera and receiver system as defined in claim 19 wherein said cathode ray tube display includes:
- a left cathode ray tube operably connected to said second means first horizontal scan generator and said vertical scan voltage generator, said left cathode ray tube receiving said first horizontal scan voltage signal and said vertical scan voltage signal; and
- a right cathode ray tube operably connected to said third means second horizontal scan generator and connected to said second means vertical scan generator, said right cathode ray tube operably receiving said second horizontal scan voltage signal and said vertical scan voltage signal, said left cathode ray tube presenting the scene in accordance with said TV video signal received from said TV camera and is viewed by the left eye of an observer, and said right cathode ray tube presenting the scene in accordance with said TV video signal received from said TV camera having said horizontal scan voltage signal modified by said video depth signal and is viewed by the right eye of an observer in three-dimensional stereoscopic viewing.

* * * * *